J. ENDERS.
Carriage-Spring.

No. 202,340. Patented April 16, 1878.

Witnesses
Frank Pardee
W. P. Lincoln

Inventor
Joseph Enders
By A. M. Stout atty

N. PETERS, PHOTO-LITHOGRAPHER, WASHINGTON, D. C.

UNITED STATES PATENT OFFICE.

JOSEPH ENDERS, OF LOUISVILLE, KENTUCKY.

IMPROVEMENT IN CARRIAGE-SPRINGS.

Specification forming part of Letters Patent No. 202,340, dated April 16, 1878; application filed August 31, 1877.

*To all whom it may concern:*

Be it known that I, JOSEPH ENDERS, of the city of Louisville, in the county of Jefferson and State of Kentucky, have invented a certain new and useful Improvement in Buggies and other similar Vehicles; and I do hereby declare that the following is a full, clear, and exact description of the construction and operation of the same, reference being had to the annexed drawings, forming part of this specification, and the letters of reference marked thereon.

My invention relates to the seating of straight springs under the two side bars of a vehicle, the middle portions of such springs being attached to the side bars, and mounting such springs by means of simple eyes in their front and rear ends upon equalizing-rods, which extend across the frame, and mounting the body of the vehicle upon the equalizing-rods, they being placed bow or shaft upward, so that, under pressure of weight in the body, the ends only of the springs will yield downward; and also to a hinge device by which either one of such equalizing-rods may be attached to the body, and the rod be allowed to turn therein, so that the springs may be free to shorten or elongate under more or less pressure.

My improvement will be more fully described with reference to the accompanying drawings, in which—

Figure 1:
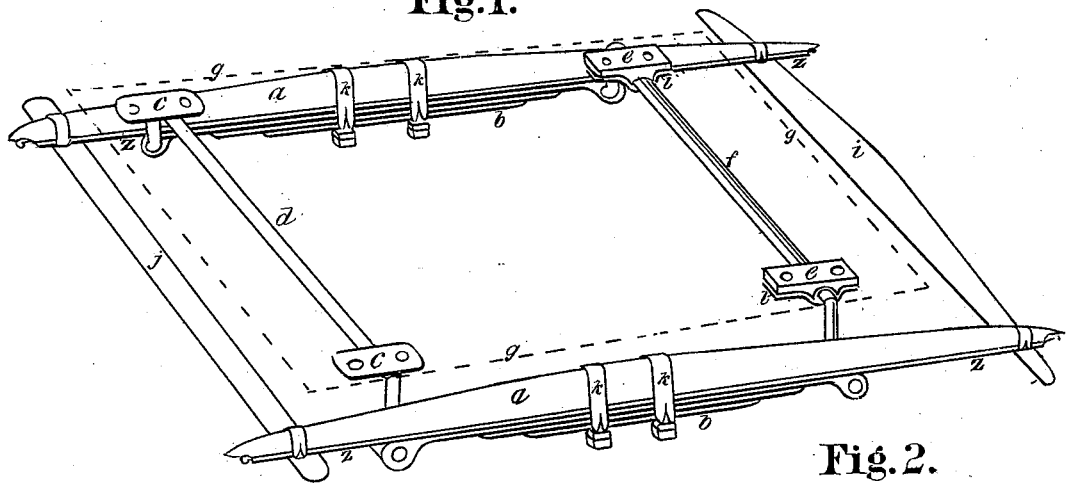
Figure 2:
Figure 3:
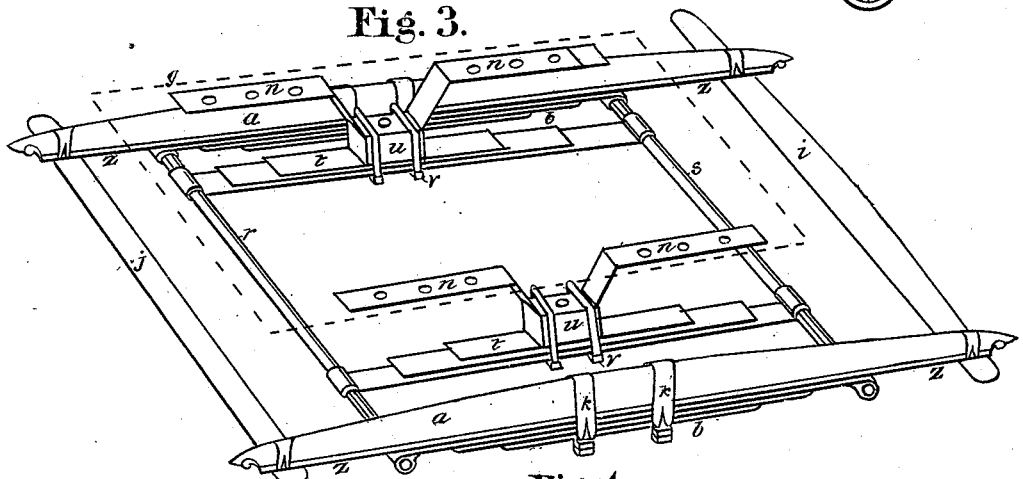
Figure 4:
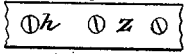

Figure 1 is a perspective view of a part of the running-gear and springs of a vehicle embracing my improvement; Fig. 3, a like view of the same, showing a different construction; and Fig. 4, a detail view of a stiffening-plate for the side bar; but no claim is made herein for what is shown in Figs. 3 and 4, as I intend to make a separate application therefor. Fig. 2 represents a detail view of the hinge device before mentioned.

$a\ a$ are the side bars; $b\ b$, the straight plate-springs, fastened to the side bars on the under side thereof by means of the clips $k\ k$; $d$ and $f$, the equalizing-rods; $e\ l$, the hinge device, mounted on the equalizing-rod $f$; $g$, the body, and $c\ c$ are the ears, by means of which the rod $d$ and the body $g$ are rigidly attached together.

The plates $e$ and $l$ are rigidly attached to the body by means of screws or bolts; but they are recessed on their inner sides for the accommodation of the equalizing-rod $f$, which is allowed to turn freely in the recess so formed, and allow the points or pins of that rod to advance or recede lengthwise of the springs and afford them the freedom of action sought for. Each of the rods $d$ and $f$ is so bent near the ends that such ends shall stand as cranks at right angles to its body or shaft, and the end of the crank so formed is bent so as to stand at right angles thereto, and the pin thus formed is inserted in the eye of the spring, and works therein; and when the rod is attached to the body $g$ the shaft or body of the rod stands vertically over its pins.

In the patent granted to me for carriage-springs, dated March 16, 1875, equalizing-rods are shown and described having exactly the form shown in Fig. 1; but, as shown in that patent, the shaft of the rod is vertically below the pins, and the pins in both equalizing-rods work freely in the half-elliptic springs which are seated on top of the side bars; but when the shafts of the rods are placed above the pins, as shown in Fig. 1, the operation is different, and, unless one of the rods were attached rigidly to the body $g$ of the vehicle, they would both turn down with their shafts nearly on a level with their pins.

What I claim as my invention, and desire to secure by Letters Patent, is—

The combination of the straight springs $b\ b$, seated under the side bars $a\ a$, and the equalizing-rods $d$ and $f$, placed bow upward, the rod $d$ rigidly attached to the body of the vehicle, while the rod $f$ is attached thereto by the hinge device $e\ l$, adapted to afford free endwise action to the springs, substantially as described and set forth.

JOSEPH ENDERS.

Witnesses:
 FRANK PARDON,
 C. HEWITT.